United States Patent
Dangel et al.

(10) Patent No.: US 9,632,249 B1
(45) Date of Patent: Apr. 25, 2017

(54) WAFER PROBER FOR TESTING IN-WAFER PHOTONIC INTEGRATED CIRCUITS

(71) Applicant: International Business Machines Coporation, Armonk, NY (US)

(72) Inventors: Roger F. Dangel, Zug (CH); Daniel S. Jubin, Langnau am Albis (CH); Antonio La Porta, Kilchberg (CH); Jonas R. Weiss, Hirzel (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/941,959

(22) Filed: Nov. 16, 2015

(51) Int. Cl.
G02B 6/125 (2006.01)
G02B 6/12 (2006.01)
G02B 6/122 (2006.01)

(52) U.S. Cl.
CPC ......... *G02B 6/125* (2013.01); *G02B 6/12002* (2013.01); *G02B 6/12004* (2013.01); *G02B 6/1221* (2013.01); G02B 2006/12147 (2013.01)

(58) Field of Classification Search
CPC G02B 6/125; G02B 6/12002; G02B 6/12004; G02B 6/1221; G02B 2006/12147
See application file for complete search history.

(56) References Cited

U.S. PATENT DOCUMENTS

| 7,792,396 | B2 | 9/2010 | Kish, Jr. et al. |
| 8,520,991 | B2 | 8/2013 | Hofrichter et al. |
| 8,625,942 | B2 | 1/2014 | Na et al. |
| 8,803,268 | B2 | 8/2014 | Heck et al. |
| 2009/0324163 | A1* | 12/2009 | Dougherty ............. B82Y 20/00 385/14 |
| 2013/0251305 | A1* | 9/2013 | Barwicz ................. G02B 6/305 385/14 |
| 2014/0043050 | A1 | 2/2014 | Stone et al. |

OTHER PUBLICATIONS

H. Kim, et al., "A Novel Massively Parallel Testing Method Using Multi-Root for High Reliability", IEEE, Jan. 29, 2014, p. 1-11.
Y. Fu, et al.,"Efficient adiabatic silicon-on-insulator waveguide taper", Photon. Res., Chines Laser Press, vol. 2, No. 3, Jun. 2014, p. 1-4.

* cited by examiner

*Primary Examiner* — Ryan Lepisto
(74) *Attorney, Agent, or Firm* — Cantor Colburn LLP; Dan Morris

(57) ABSTRACT

The invention relates to a wafer prober including an optical waveguide, the optical waveguide having a first optical coupling end segment with a first optical coupling surface being devoid of cladding. The first optical coupling end segment being configured to provide an adiabatic optical coupling to a second optical coupling end segment of a second optical waveguide of a photonic integrated circuit on a semiconductor wafer when the optical waveguide is aligned with respect to the semiconductor wafer according to a set of alignment requirements. The second optical coupling end segment having a second optical coupling surface that is devoid of cladding. The second optical coupling surface is parallel to a wafer surface of the semiconductor wafer. An alignment system configured to align the optical waveguide with respect to the semiconductor wafer according to the set of alignment requirements.

18 Claims, 1 Drawing Sheet

WAFER PROBER FOR TESTING IN-WAFER PHOTONIC INTEGRATED CIRCUITS

BACKGROUND

The present invention relates to information processing apparatus, an information processing methods and programs.

Modern integrated circuits can have not only discrete elements (e.g. transistors) but further comprise photonic components. Electrical test terminals of the discrete elements or of functional groups thereof are as usual located on a surface of a wafer. Such an allocation of the electrical test terminals enables early testing of the integrated circuits. For instance this early testing using the electrical test terminals can be performed before dicing of the wafer in order to ink out the defect dies. After the testing only the chips complying with the specification are processed further (e.g. bonding, packaging, further testing, etc.). Electrical contacting is done as usual by employing electrically conducting needles for connecting an electrical test system with the electrical test terminals. The same electrical test terminals can be further used for bonding.

In contrast, operational photonic terminals used for connecting the chips to external optical waveguides of the package and test photonic terminals of the chips used for optical in-wafer testing are different. The operational photonic terminals are open only after dicing of the chips because they are allocated on sidewalls of the chips. Thus performing optical in-wafer tests requires forming additional test photonic terminals on a wafer surface. As usual they are implemented as an optical coupling segment of an optical waveguide of a chip, wherein the optical coupling segment is covered by a grating enabling optical coupling of an external light source (e.g. a laser) to the optical waveguide of the chip. Forming of such a complex coupling structures on the wafer surface requires not only additional process steps but demands a substantial area of the wafer surface to be sacrificed for these optical couplings. As a result thereof a substantial area is wasted for test structures which are not used for operation of chips after their packaging.

SUMMARY

The present invention provides for a wafer prober configured to provide an optical coupling to compact optical coupling elements on a wafer surface, an optical wave guide configured to provide same, and a method for providing optical coupling to the compact optical coupling elements of the wafer surface.

One embodiment provides for a wafer prober. The wafer prober comprises an optical waveguide and an alignment system configured to align the optical waveguide with respect to a semiconductor wafer according to a set of alignment requirements. The optical waveguide comprises a first optical coupling end segment with a first optical coupling surface being devoid of cladding. The first optical coupling end segment is configured to provide an adiabatic optical coupling to a second optical coupling end segment of a second optical waveguide of a photonic integrated circuit on the semiconductor wafer when the optical waveguide is aligned with respect to the semiconductor wafer according to the set of alignment requirements. The second optical coupling end segment comprises a second optical coupling surface being devoid of cladding, wherein the second optical coupling surface is parallel to a wafer surface of the semiconductor wafer.

The set of alignment requirements comprises: the second optical coupling surface being parallel to and faces the first optical coupling surface and a geometrical plane comprising a longitudinal geometric axis of symmetry of a first core of the first optical coupling end segment and a longitudinal geometric axis of symmetry of a second core of the second optical coupling end segment being perpendicular to the wafer surface.

Another embodiment provides for a method for providing an adiabatic coupling between a first optical coupling end segment of an optical waveguide and a second optical coupling end segment of a second optical waveguide of a photonic integrated circuit on a semiconductor wafer. The method comprises: aligning the optical waveguide with respect to the semiconductor wafer according to the aforementioned set of alignment requirements. The first optical segment comprises a first optical coupling surface being devoid of cladding and the second optical coupling end segment comprises a second optical coupling surface being devoid of cladding. The second optical coupling surface is parallel to a wafer surface of the semiconductor wafer.

Yet another embodiment provides for an optical waveguide. The optical waveguide comprises a first optical coupling end segment with a first optical coupling surface being devoid of cladding. The first optical coupling end segment is configured to provide an adiabatic optical coupling to a second optical coupling end segment of a second optical waveguide of a photonic integrated circuit on a semiconductor wafer when a second optical coupling surface of the second optical coupling end segment is parallel to and faces the first optical coupling surface, the second optical coupling surface being devoid of cladding, the second optical coupling surface being parallel to a wafer surface of the semiconductor wafer, and a geometrical plane comprising a longitudinal geometric axis of symmetry of a first core of the first optical coupling end segment and a longitudinal geometric axis of symmetry of a second core of the second optical coupling end segment is perpendicular to the wafer surface.

BRIEF DESCRIPTION OF THE DRAWINGS

In the following embodiments of the invention are explained in greater detail, by way of example only, making reference to the drawings in which.

DETAILED DESCRIPTION

Figure 1:
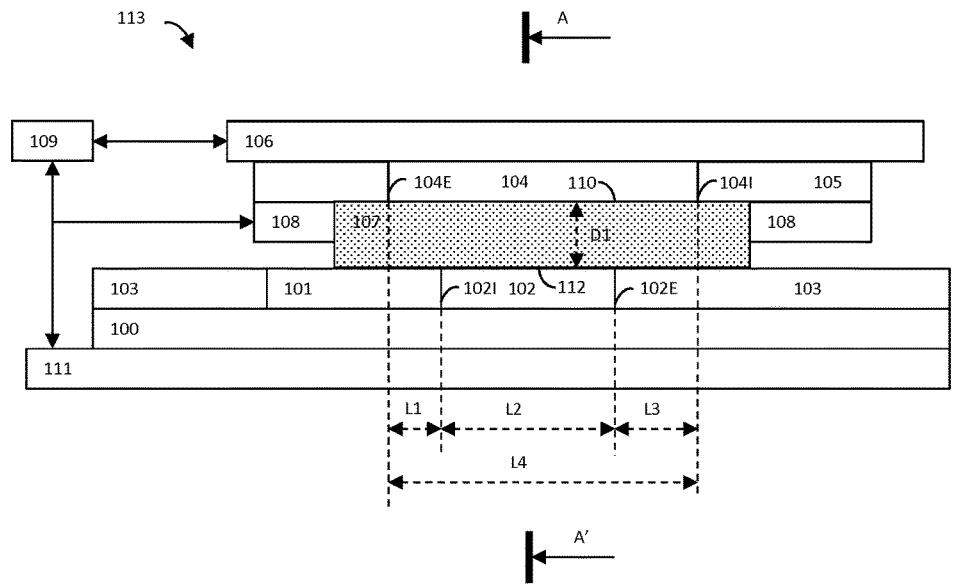
FIG. 1 depicts a wafer prober.

Minimization of "silicon real estate" sacrificed for test structures is an everlasting problem of the semiconductor industry. To a certain extent this problem is solved by placing the test structures in dicing streets between dies on wafers. However, small test structures allocated in the dicing streets do not always provide sufficient information about the die performance. Direct in-wafer testing of chips before dicing can be the only one way for inking out chips which do not comply with the specification. This problem can be solved when testing of the chips can be performed via bonding pads of the chips. However testing of photonic chips having optical waveguides cannot be implemented in the same way. Special optical coupling structures have to be formed on a wafer surface in order to provide optical coupling of the optical waveguides on the wafer to the external light sources (e.g. lasers). Employing grating structures optically coupled to the optical waveguides enables in-wafer testing of chips comprising photonic circuits. The grating based optical coupling elements may have numerous disadvantages. For instance, a big area of the "silicon real estate" has to be sacrificed for forming these coupling elements. As a result thereof, the useful load of the chip area is substantially reduced, especially in a case when a lot of optical signals have to be coupled to and/or received from the chip. Another problem related to employing of the grating based optical couplings emerges from a need to use optical systems configured to generate/receive optical rays compatible with the gratings. This problem will manifest itself at most when multiple test optical coupling terminals have to be connected to an external test optical system. Since the chip area is very small, the need to send to and/or receive from the chip of multiple optical signals can require a sophisticated optical multi-channel system, wherein said multiple optical signals have to share the same optical path (e.g. focusing and/or collecting optics).

The optical waveguide, the wafer prober comprising the optical waveguide, and a method of using the waveguide disclosed herein may have advantages, because the optical coupling is implemented between an in-wafer optical coupling end segment of the optical waveguide and an optical coupling segment of the optical waveguide of a photonic circuit on a semiconductor wafer. The optical coupling end segment of the optical waveguide and the optical coupling segment of the optical waveguide of the photonic circuit on the semiconductor wafer are compact structures enabling parallel implementation of multiple coupling channels to the photonic circuit. There is no need for a complex multichannel optical system. The compactness of the optical coupling enables not only a substantial reduction of the chip area used for structures providing optical coupling, but a combination of optical and electrical testing because the optical coupling segments of the optical waveguides can be easily allocated on a wafer probe card together with needles providing electrical coupling.

The optical waveguide comprises a first optical coupling end segment with a first optical coupling surface being devoid of cladding. The first optical coupling end segment is configured to provide an adiabatic optical coupling to a second optical coupling end segment of a second optical waveguide of a photonic integrated circuit on a semiconductor wafer when a second optical coupling surface of the second optical coupling end segment is parallel to and faces the first optical coupling surface, the second optical coupling surface being devoid of cladding, the second optical coupling surface being parallel to a wafer surface of the semiconductor wafer, and a geometrical plane comprising a longitudinal geometric axis of symmetry of a first core of the first optical coupling end segment and a longitudinal geometric axis of symmetry of a second core of the second optical coupling end segment is perpendicular to the wafer surface.

The optical waveguide can be integrated in a wafer prober comprising an alignment system configured to align the optical waveguide with respect to the semiconductor wafer according to the set of alignment requirements. The set of alignment requirements comprises: the second optical coupling surface is parallel to and faces the first optical coupling surface and a geometrical plane comprising a longitudinal geometric axis of symmetry of a first core of the first optical coupling end segment and a longitudinal geometric axis of symmetry of a second core of the second optical coupling end segment is perpendicular to the wafer surface.

In one embodiment, the optical wave guide and the second optical waveguide being single mode optical waveguides. This can be of advantage, because employment of single mode optical waveguides is customary in photonic circuitry. In another embodiment, the optical waveguide is configured to function at a wavelength in a range of 1240-1380 nm, the second waveguide is configured to function at a wavelength in the range of 1240-1380 nm. Operation of the optical waveguides in the range of 1240-1380 nm can be advantageous because this range is one of the customary rages in which the optical waveguides of silicon based photonic chips operate.

In another embodiment, the optical waveguide is configured to function at a wavelength in a range of 1450-1580 nm and the second optical waveguide is configured to function at a wavelength in the range of 1450-1580 nm. Operation of the optical waveguides in the range of 1450-1580 nm can be advantageous because this range is one of the customary rages in which the optical waveguides of silicon based photonic chips operate.

In another embodiment, the optical waveguide is a polymer-based waveguide comprising at least one of the following materials: silsesquioxane, poly-dimethylsiloxane, perfluoropolymer, acrylate, polyurethane, epoxy, and fluorinated polyimide. Such an implementation of the optical waveguide can be advantageous because it is based on a flexible optical waveguide. The flexible optical waveguide can be easily integrated on a wafer probe card, which can accommodate other test accessories such as other optical waveguides and/or needles for electrical testing.

In another embodiment, the optical waveguide is a glass waveguide. Such an implementation of the optical waveguide can be advantageous because it is based on a rigid optical waveguide. The rigidity of the optical waveguide can enable aligning of the optical waveguide in the proximity of the wafer without the need to provide a rigid support for it. As a result thereof the rigid optical waveguide can be allocated in between closely spaced needles used for electrical testing.

In another embodiment, the second core of the optical coupling end segment of the second optical waveguide on the semiconductor wafer has a longitudinally tapered shape. This implementation can be advantageous because it does not require any additional grating. Moreover implementation of this shape may not require any additional process steps, i.e. the core of the optical coupling end segment and a core of the optical waveguide on the wafer connected to the core of the optical coupling end segment can be manufactured in the same process.

In another embodiment, the second core of the optical coupling end segment of the second optical waveguide on the semiconductor wafer has a length shorter than 3 mm. For example, it can have the length of 2 mm. Such an implementation of the core of the optical coupling end segment of the optical waveguide on the semiconductor wafer can be advantageous because it is compact.

In another embodiment, a cross-section of the second core at its end connected to a core of the second optical waveguide completely covered by cladding matches a cross-section of the core of the second optical waveguide completely covered by cladding and an area of a cross-section of the second core at its other end is bigger than 5% of an area of the cross-section of the core of the second optical waveguide completely covered by cladding. Such an implementation of the core of the optical coupling end segment of the optical waveguide on the semiconductor wafer can be advantageous because it is compact.

In another embodiment, the first core of the first optical coupling end segment of the optical waveguide (of the wafer prober) has the same cross-section throughout its length. Such an implementation of the core of the optical coupling end segment of the optical waveguide can be advantageous for providing adiabatic and/or compact coupling to the optical coupling end segment of the optical waveguide on the semiconductor wafer.

In another embodiment, a length of the first core of the first optical coupling end segment of the optical waveguide (of the wafer prober) is longer than a length of the second core of the second optical coupling end segment of the optical waveguide on the semiconductor wafer. Such an implementation of the cores of the optical coupling end segments of the optical waveguides can be advantageous for providing adiabatic and/or compact coupling to the optical coupling end segment of the optical waveguide on the semiconductor wafer.

In another embodiment, the set of alignment requirements comprises: the second optical coupling surface being in contact with the first optical coupling surface. This alignment requirement can be of particular advantage when a polymer waveguide is employed. In this case the flexible optical coupling surface can provide almost perfect coverage of the rigid optical coupling surface. Direct contact of the first and the second optical coupling surfaces can improve the quality of the adiabatic optical coupling between the optical waveguide and the second optical waveguide, e.g. reduction of the coupling loss.

In another embodiment, the set of alignment requirements comprises: a distance between the second optical coupling surface and the first optical coupling surface being bigger than zero and less than 2 micrometers. This alignment requirement can be of particular advantage, when the adiabatic coupling has to be provided in a contactless mode, when a contact between the first and the second optical coupling surfaces has to be avoided, e.g. when the first and the second optical coupling surfaces are made of rigid materials.

In another embodiment, the wafer prober comprises means for providing in a space between the first and the second optical coupling surface a medium having a refractive index less or equal to a refractive index of the first core, wherein the first optical coupling end segment is configured to provide the adiabatic optical coupling to the second optical coupling end segment when the space between the first and the second optical coupling surface is filled with the medium. This embodiment can provide for a further improvement of the adiabatic coupling, wherein a medium between the first optical coupling and the second coupling surface facilitates adiabatic coupling by confining within it the electromagnetic radiation.

In another embodiment, the first core has first sidewalls being devoid of cladding, wherein the first sidewalls are adjacent to the first optical coupling surface. This embodiment can facilitate coupling of the first core to the second core, because in this embodiment, the electromagnetic radiation can pass not only via the first optical coupling surface but via the first sidewalls.

In another embodiment, the second core has second sidewalls being devoid of cladding, wherein the second sidewalls are adjacent to the second optical coupling surface. This embodiment can facilitate coupling of the first core to the second core, because in this embodiment, the electromagnetic radiation can pass not only via the second optical coupling surface but via the second sidewalls.

In another embodiment, the wafer prober further comprises means for providing a contiguous volume of a medium filling a space between the first and the second optical coupling surface and covering the first and the second sidewalls, the medium having a refractive index less or equal to a refractive index of a core of the first optical coupling end segment, wherein the first optical coupling end segment is configured to provide the adiabatic optical coupling to the second optical coupling end segment when the contiguous volume of the medium fills the space between the first and the second optical coupling surface and covers the first and the second sidewalls.

This embodiment can facilitate coupling of the first core to the second core, because in this embodiment, the electromagnetic radiation can pass not only via the second and the first optical coupling surface but via the second and the first sidewalls. The electromagnetic radiation can be further confined within the medium.

In another embodiment, the set of alignment requirements further comprises: a length of an end portion of the first core being immediately above a portion of the second waveguide having its core completely covered by cladding and attached to the second core is bigger than zero and less than a first length, the first length being less than 10% of a length of the second core, wherein a length of the first core is bigger than a sum of a length of the second core and the first length.

The embodiment can specify an advantageous alignment of the first optical coupling end segment with respect to the second optical coupling end segment in a lateral direction parallel to the longitudinal geometric axis of symmetry of the first core and a longitudinal geometric axis of symmetry of the second core.

Figure 2:
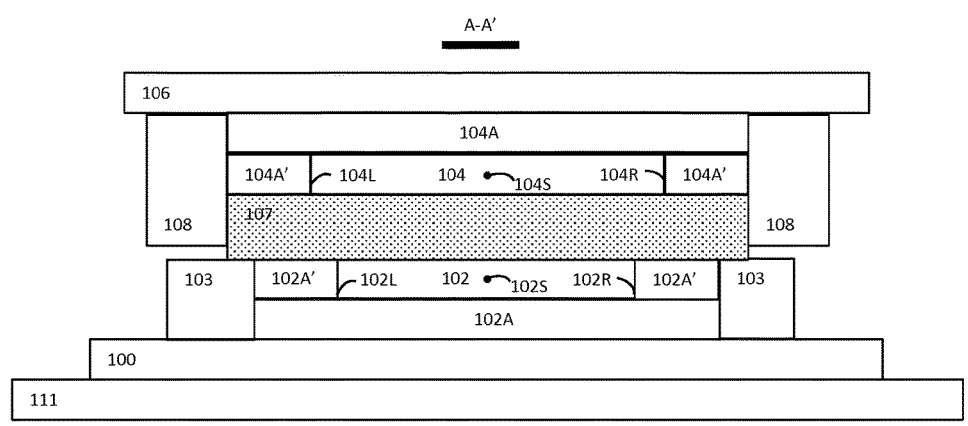
FIG. 2 depicts a cross-section of a wafer prober.

FIG. 1 depicts a wafer prober 113 comprising the optical waveguide 104, 105. The optical waveguide comprises an optical coupling end segment 104 having the first optical coupling surface 110 being devoid of cladding and a segment 105 having its core completely covered by cladding. Merely for illustrative purposes, the first optical coupling end segment is depicted as single unit 104 on the FIG. 1. Detailed structure of the first optical coupling end segment is depicted on the cross-section (FIG. 2). The first core 104' of the first optical coupling end segment 104 of the optical waveguide 104, 105 has a first optical coupling surface 110 being devoid of cladding. The surface of the first core being opposite to the first optical coupling surface is covered by cladding 104A. First sidewalls 104L and 104R of the first core can be as option devoid of cladding 104A'. The first optical waveguide 104, 105 is affixed to a wafer prober card 106. The first core can have the same rectangular cross-section through-out its length. A point, where a geometrical axis of symmetry of the first core intersects a plane of the cross-section depicted on the FIG. 2, is marked by a dot 104S. A cross-section of the first core matches a cross-section of the core of the segment 105 at an interface 104I, wherein these two cores are attached to each other.

The optical waveguide 104, 105 can flexible or rigid. It can be a glass waveguide or made out of a least one of the following materials: silsesquioxane, poly-dimethylsiloxane, perfluoropolymer, acrylate, polyurethane, epoxy, and fluorinated polyimide.

The wafer prober comprises further a wafer holder 111 for holding a semiconductor wafer 100. The semiconductor wafer 100 comprises photonic circuitry 103 and as option electronic circuitry. The photonic circuitry comprises a second optical waveguide 101, 102 having the second optical coupling surface 112 being devoid of cladding and a segment 103 having its core completely covered by cladding. Merely for illustrative purposes, the second optical coupling end segment is depicted as single unit 102 on the FIG. 1. Detailed structure of the second optical coupling end segment is depicted on the cross-section below. The second core 102' of the second optical coupling end segment 102 of the optical waveguide 102, 103 has a second optical coupling surface 112 being devoid of cladding. The surface of the second core being opposite to the second optical coupling surface is covered by cladding 102A. Second sidewalls 102L and 102R of the second core can be as option devoid of cladding 102A'. The second optical coupling surface 112 is parallel to a wafer surface. The second core can have a longitudinally tapered shape, wherein the second optical coupling surface of the second core is parallel to the surface of the second core covered by cladding 102A. A point, where a geometrical axis of symmetry of the second core intersects a plane of the cross-section depicted on FIG. 2, is marked by a dot 102S. A cross-section of the second core matches a cross-section of the second core of the second optical coupling end segment 101 at an interface 102I, wherein these two cores are attached to each other. A cross-section of the second core at an end 102E being opposite to the interface end 102I of the second core can be less than 100% and bigger than 5% of the cross-section and the interface end 102I of the second core. The second core can have a length L2 in a direction of its geometrical axis of symmetry less than 3 mm, preferably less than 2 mm. The first core can have a length L4 in a direction of its geometrical axis of symmetry bigger than the length of the second core. The second optical waveguide can have a Si core embedded in a $SiO_2$ cladding.

The optical waveguide and the second optical waveguide can be single mode optical waveguides. They can be configured to function at wavelengths in arrange of 1240-1380 nm or in a range 1450-1580 nm.

The optical waveguide 105, 104 can be configured to provide adiabatic coupling to the second optical waveguide 101, 102 when a space between the first optical coupling surface and the second coupling surface is filled by a medium 107 having a refractive index less or equal to a refractive index of the first core. The medium can be liquid (e.g. water or oil), a gel, or a solid (e.g. wax), which can fill the space in a molten state, while the measurements being performed when it is solidified. When the first side walls 104L, 104R and/or the second side walls 102L, 102R are devoid of cladding, then a contiguous volume of the medium 107 convers the sidewalls being devoid of cladding.

The wafer prober 113 can comprise means 108 for providing the medium as specified above. The means 108 can be implemented in different ways, for instance the means 108 can provide continuous circulation of liquid medium 107 as it is customary in immersion lithography, alternatively the means 108 can be configured to dispense the medium of the wafer surface before optical measurements and as option recollecting the dispensed medium after the optical measurements.

The optical waveguide 105, 104 is configured to provide adiabatic coupling to the second optical waveguide 101, 102 when a set of alignment requirements is fulfilled. The set of alignment requirements comprises the following: the second optical coupling surface 112 is parallel to and faces the first optical coupling surface 110 and a geometrical plane comprising a longitudinal geometric axis of symmetry of the first core 104' of the first optical coupling end segment 104 and a longitudinal geometric axis of symmetry of a second core 102' of the second optical coupling end segment 102 is perpendicular to the wafer surface.

The set of alignment requirements can further comprise another requirement when either the second coupling surface 112 is in contact with the first optical coupling surface 110 or a distance D1 between the second optical coupling surface and the first optical coupling surface being bigger than zero and less than 2 micrometers.

The set of alignment requirements can further specify alignment of the first optical coupling end segment 104 with respect to the second optical coupling end segment 102 in a lateral direction parallel to the longitudinal geometric axis of symmetry of the first core 104' and a longitudinal geometric axis of symmetry of the second core 102'. The length L2 of the second core 102' is parallel to the length L4 of the first core 104', wherein a projection of the second length L2 on the first length L4 is completely comprised in the first length. A length L1 of an end portion of the first core 104' being immediately above a portion of the second waveguide 101 having its core completely covered by cladding and attached to the second core 102' is bigger than zero and less than a first length, wherein the first length is less than 10% of the length L4 of the second core 102', and the length L4 of the first core 104' is bigger than a sum of a length L2 of the second core 102' and the first length. The length L1 of the end portion of the first core is determined by an interval between an end point 104E of the first core 104' and a projection of the interface point 102I limiting the length of the second core 102' on the length L4 of the first core 104'.

The wafer prober further comprises an alignment system configured to align the optical waveguide 105, 104 with respect to the semiconductor wafer 100 according to the set of alignment requirements. The aliment system can comprise a motorized stage of the wafer holder 111 and or a motorized holder of the wafer probe card. The wafer prober can further comprise a computer system 109 configured to operate the alignment system and/or means for providing the medium and/or means for conducting optical/electrical measurements.

The optical waveguide can be used according to the following method for providing an adiabatic coupling between the first optical coupling end segment 104 of the optical waveguide 104, 105 and the second optical coupling end segment 102 of the second optical waveguide 101, 102 of a photonic integrated circuit 103 on a semiconductor wafer 100. The method can be executed with or without the wafer prober 113. The method comprises the following: aligning the optical waveguide with respect to the semiconductor wafer according to the set of the aforementioned alignment requirements, wherein the first optical segment comprises a first optical coupling surface being devoid of cladding and the second optical coupling end segment comprises a second optical coupling surface being devoid of cladding, wherein the second optical coupling surface is parallel to a wafer surface of the semiconductor wafer.

The method can further comprise the following steps when executed using the wafer prober: after the aligning the optical waveguide providing the medium 107 in between the first 110 and the second 112 optical coupling surfaces as described above and performing a photonic/optical measurement of a photonic circuitry 103 via the first 104, 105 and the second 101, 102 optical waveguide.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wafer prober, the wafer prober comprising:
    an optical waveguide, the optical waveguide comprising a first optical coupling end segment with a first optical coupling surface being devoid of cladding, the first optical coupling end segment being configured to provide an adiabatic optical coupling to a second optical coupling end segment of a second optical waveguide of a photonic integrated circuit on a semiconductor wafer when the optical waveguide is aligned with respect to the semiconductor wafer according to a set of alignment requirements, the second optical coupling end segment comprising a second optical coupling surface being devoid of cladding, the second optical coupling surface being parallel to a wafer surface of the semiconductor wafer; and
    an alignment system configured to align the optical waveguide with respect to the semiconductor wafer according to the set of alignment requirements,
    wherein the set of alignment requirements comprises:
        the second optical coupling surface is parallel to and faces the first optical coupling surface; and
        a geometrical plane comprising a longitudinal geometric axis of symmetry of a first core of the first optical coupling end segment and a longitudinal geometric axis of symmetry of a second core of the second optical coupling end segment is perpendicular to the wafer surface, wherein the second core having a longitudinally tapered shape,
    wherein a cross-section of the second core at its end connected to a core of the second optical waveguide completely covered by cladding matches a cross-section of the core of the second optical waveguide completely covered by cladding and an area of a cross-section of the second core at its other end is bigger than 5% of an area of the cross-section of the core of the second optical waveguide completely covered by cladding.

2. The wafer prober of claim 1, the optical wave guide and the second optical waveguide being single mode optical waveguides.

3. The wafer prober of claim 1, the optical waveguide being configured to function at a wavelength in a range of 1240-1380 nm, the second waveguide being configured to function at a wavelength in the range of 1240-1380 nm.

4. The wafer prober of claim 1, the optical waveguide being configured to function at a wavelength in a range of 1450-1580 nm, the second waveguide being configured to function at a wavelength in the range of 1450-1580 nm.

5. The wafer prober of claim 1, the optical waveguide is a polymer-based waveguide comprising at least one of the following materials: silsesquioxane, poly-dimethylsiloxane, perfluoropolymer, acrylate, polyurethane, epoxy, and fluorinated polyimide.

6. The wafer prober of claim 1, the optical waveguide being a glass waveguide.

7. The wafer prober of claim 1, the second core having a length shorter than 3 mm.

8. The wafer prober of claim 1, the first core having the same cross-section throughout its length.

9. The wafer prober of claim 1, a length of the first core being longer than the length of the second core.

10. The wafer prober of claim 1, the set of alignment requirements comprising: the second optical coupling surface being in contact with the first optical coupling surface.

11. The wafer prober of claim 1, the set of alignment requirements comprises
    a distance between the second optical coupling surface and the first optical coupling surface being bigger than zero and less than 2 micrometers.

12. The wafer prober of claim 1, the wafer prober further comprising means for providing in a space between the first and the second optical coupling surface a medium having a refractive index less or equal to a refractive index of the first core, wherein the first optical coupling end segment is configured to provide the adiabatic optical coupling to the second optical coupling end segment when the space between the first and the second optical coupling surface is filled with the medium.

13. The wafer prober of claim 1, the first core having first sidewalls being devoid of cladding, the first sidewalls being adjacent to the first optical coupling surface.

14. The wafer prober of claim 13, the second core having second sidewalls being devoid of cladding, the second sidewalls being adjacent to the second optical coupling surface.

15. The wafer prober of claim 14, wafer prober further comprising means for providing a contiguous volume of a medium filling a space between the first and the second optical coupling surface and covering the first and the second sidewalls, the medium having a refractive index less or equal to a refractive index of the first core, wherein the first optical coupling end segment is configured to provide the adiabatic optical coupling to the second optical coupling end segment when the contiguous volume of the medium fills the space between the first and the second optical coupling surface and covers the first and the second sidewalls.

16. The wafer prober of claim 1, the set of alignment requirements comprising a length of an end portion of the first core being immediately above a portion of the second waveguide having its core completely covered by cladding and attached to the second core is bigger than zero and less than a first length, the first length being less than 10% of a length of the second core, wherein a length of the first core is bigger than a sum of a length of the second core and the first length.

17. A method for providing an adiabatic coupling between a first optical coupling end segment of an optical waveguide and a second optical coupling end segment of a second optical waveguide of a photonic integrated circuit on a semiconductor wafer, the method comprising:
    aligning the optical waveguide with respect to the semiconductor wafer according to a set of alignment requirements,
    wherein the first optical segment comprises a first optical coupling surface being devoid of cladding and the second optical coupling end segment comprises a second optical coupling surface being devoid of cladding, wherein the second optical coupling surface is parallel to a wafer surface of the semiconductor wafer;
    wherein the set of alignment requirements comprises:
        the second optical coupling surface is parallel to and faces the first optical coupling surface; and
        a geometrical plane comprising a longitudinal geometric axis of symmetry of a first core of the first optical coupling end segment and a longitudinal geometric axis of symmetry of a second core of the second optical coupling end segment is perpendicular to the wafer surface, wherein the second core having a longitudinally tapered shape, wherein a cross-section of the second core at its end connected to a core of the second optical waveguide completely covered by cladding matches a cross-section of the core of the second optical waveguide completely covered by cladding and an area of a cross-section of the second core at its other end is bigger than 5% of an area of the cross-section of the core of the second optical waveguide completely covered by cladding.

18. An optical waveguide, the optical waveguide comprising a first optical coupling end segment with a first optical coupling surface being devoid of cladding, the first optical coupling end segment being configured to provide an adiabatic optical coupling to a second optical coupling end segment of a second optical waveguide of a photonic integrated circuit on a semiconductor wafer based on:

a second optical coupling surface of the second optical coupling end segment is parallel to and faces the first optical coupling surface, the second optical coupling surface being devoid of cladding, the second optical coupling surface being parallel to a wafer surface of the semiconductor wafer, and a geometrical plane comprising a longitudinal geometric axis of symmetry of a first core of the first optical coupling end segment and a longitudinal geometric axis of symmetry of a second core of the second optical coupling end segment is perpendicular to the wafer surface, wherein the second core having a longitudinally tapered shape, wherein a cross-section of the second core at its end connected to a core of the second optical waveguide completely covered by cladding matches a cross-section of the core of the second optical waveguide completely covered by cladding and an area of a cross-section of the second core at its other end is bigger than 5% of an area of the cross-section of the core of the second optical waveguide completely covered by cladding.

* * * * *